UNITED STATES PATENT OFFICE.

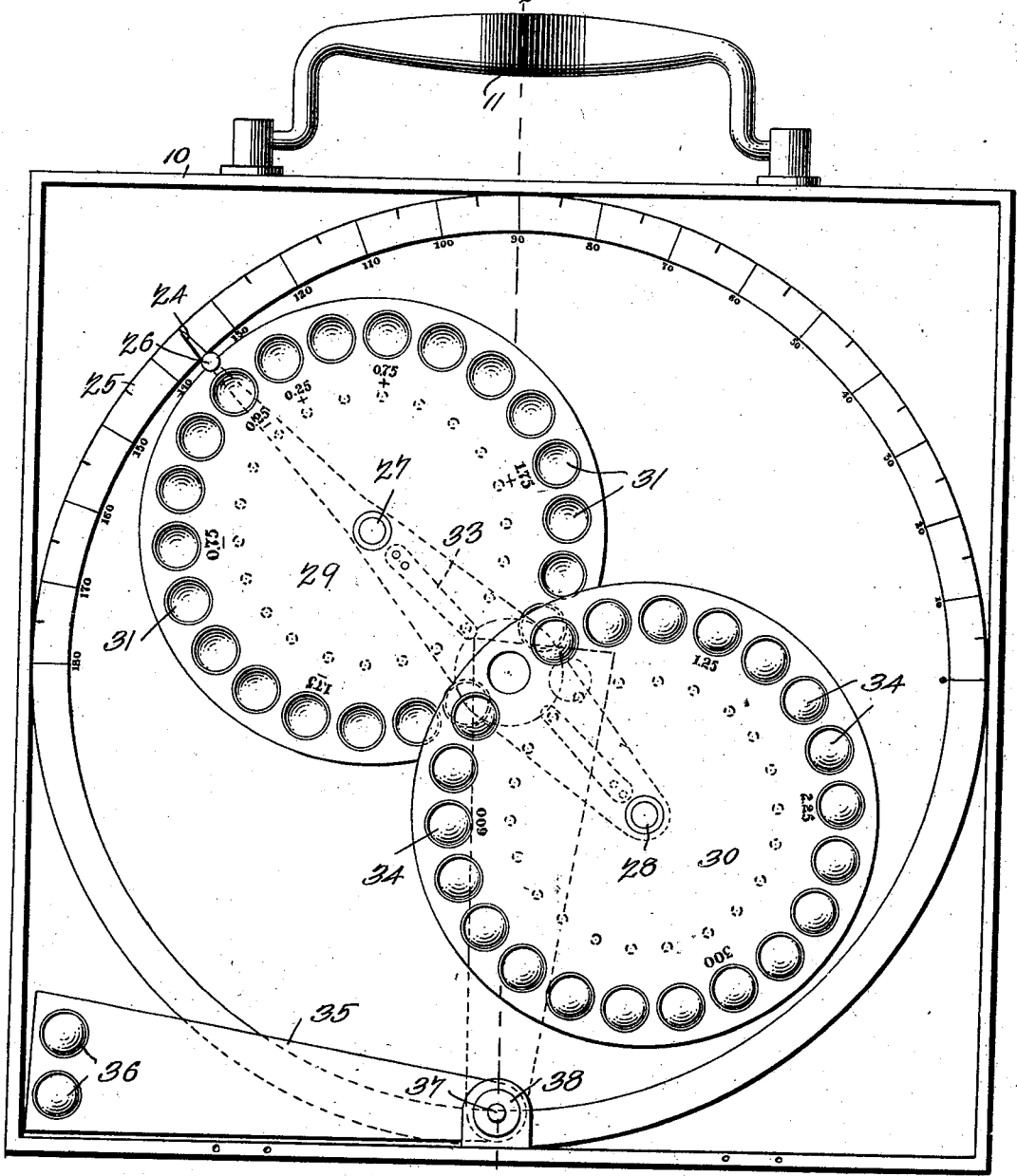

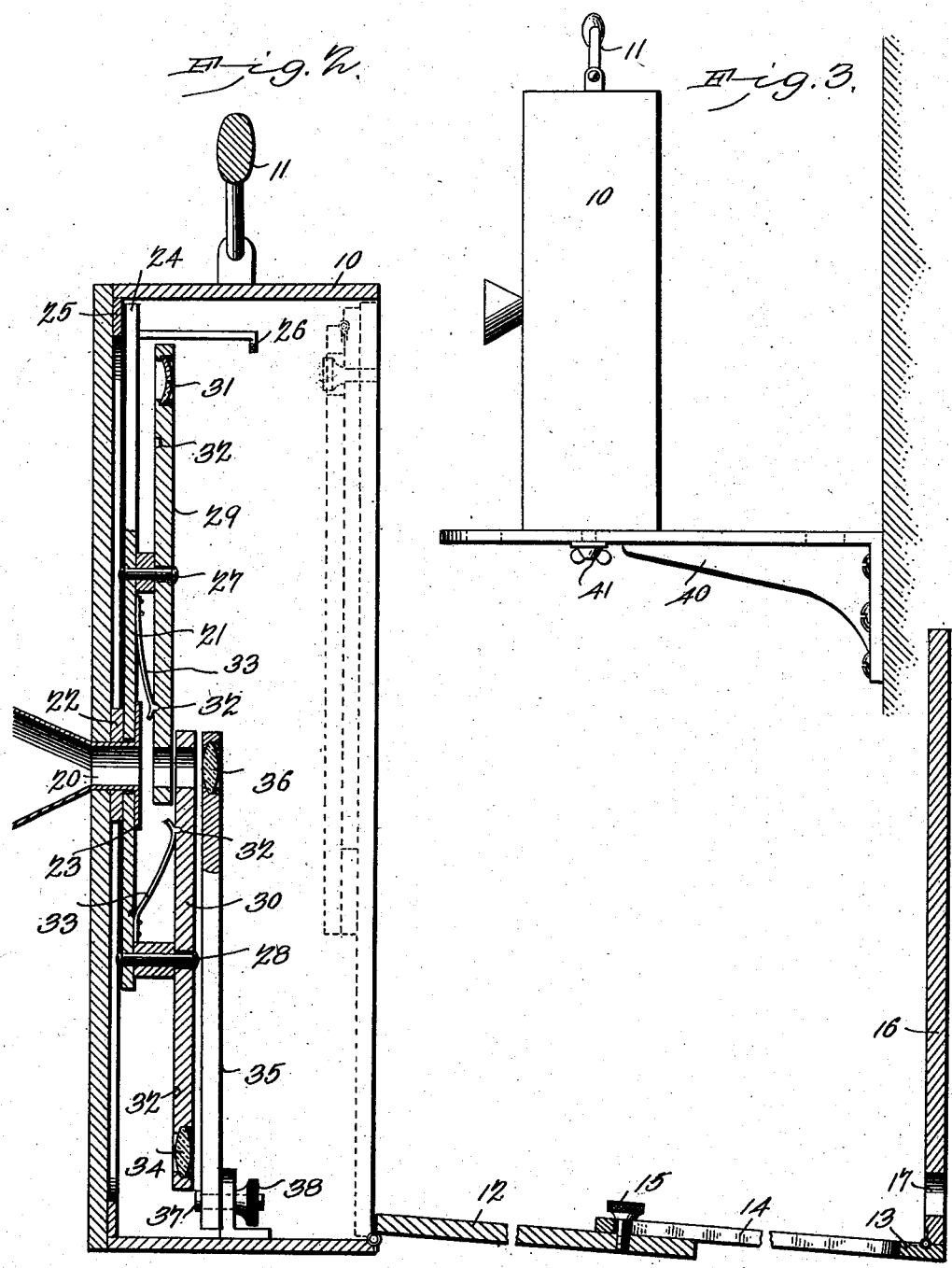

ERNEST F. WAITS, OF CORINTH, MISSISSIPPI.

OPTOMETER.

SPECIFICATION forming part of Letters Patent No. 718,293, dated January 13, 1903.

Application filed July 25, 1902. Serial No. 116,996. (No model.)

*To all whom it may concern:*

Be it known that I, ERNEST F. WAITS, a citizen of the United States, residing at Corinth, in the county of Alcorn and State of Mississippi, have invented a new and useful Optometer, of which the following is a specification.

My invention relates to certain improvements in devices for testing the eyes for hypermetropy, myopia, and similar defects of vision, and has for its principal object to provide a convenient device of this character in which a comparatively small number of lenses may be employed singly or in combination to present an extremely large number of lenses of varying strength, the mechanism being so arranged and graduated that a simple cylindrical or spherical lens or any combination of the two may be presented in alinement with a visual opening, through which the patient may inspect type or other testing devices of ordinary character.

A further object of the invention is to so arrange the mechanism as to provide for the measurement of the angle of lens best suited for particular defects of vision, as in the correction of astigmatic and other troubles.

A further object of the invention is to provide a testing device which may be readily carried from place to place and adjusted to operative position, provision being made for the proper adjustment of the distance of the test-type from the lenses in accordance with the light or for any particular test which may be desired.

With these and other objects in view the invention consists in the novel construction and arrangement of parts hereinafter described, illustrated in the accompanying drawings, and particularly pointed out in the appended claims.

In the drawings, Figure 1 is a rear elevation of an optometer constructed in accordance with my invention, the hinged rear wall of the casing being removed in order to more clearly illustrate the construction. Fig. 2 is a longitudinal sectional elevation of the device on the line 2 2 of Fig. 1. Fig. 3 is a side elevation of the apparatus, illustrating the same as mounted on a fixed wall-bracket to permit adjustment from and toward the wall or other support.

Similar numerals of reference are employed to indicate corresponding parts throughout the several figures of the drawings.

Referring to the drawings, 10 indicates a suitable casing in which all of the testing mechanism is inclosed, said casing being preferably provided with a handle 11 for carrying the device from place to place. The rear portion of the casing is provided with a hinged wall or cover 12, which may be closed to the dotted-line position illustrated in Fig. 2 in dotted lines or to the approximately-horizontal position illustrated in full lines in said figure. On the inner face of the cover is mounted a slide 13, provided with a longitudinally-disposed slot 14, through which extends a clamping-screw 15 to permit adjustment of the relative positions of the slide and cover, the screw being provided with a milled knob which may be turned to clamp the slide in any position to which it may be adjusted. To the outer end of the slide is pivotally connected a plate 16, forming a support on which may be placed cards bearing the ordinary test-type or other testing devices which it may be desired to employ, and the construction of the slide and cover is such as to permit of the adjustment of the type-carrying plate to any desired distance from the lenses. For convenience in folding the type-carrying plate said plate is provided with an opening 17 for the reception of the head of the screw 15 when the parts are folded to the position shown in dotted lines, and a suitable catch or locking device of any ordinary character may be employed to retain the cover in the closed position while the optometer is being carried from place to place.

At the central portion of the front wall of the casing is an opening for the reception of a tube 20, the rear end of which extends somewhat beyond the inner face of the wall and the outer end of said tube being provided with a flaring or funnel-shaped portion to which the eye is applied during the testing operation.

On the inner end of the tube 20 is mounted a revoluble arm 21, slightly spaced from the inner face of the wall by a fixed collar 22 and maintained in position on the tube by an annular flange 23. The arm terminates at one end in a pointer 24, which travels over a semicircular scale 25, divided into degrees from naught to one hundred and eighty, inclusive, there being a suitable operating pin or knob 26 secured to the arm and permitting its adjustment to any angular position.

The arm 21 is provided with two pins or studs 27 and 28, on which are mounted disks 29 and 30, respectively, the disk 29 being provided with an annular series of openings in all of which, with one exception, are arranged cylindrical lenses 31 of graduated strength, there being, preferably, a plurality of plus lenses and a plurality of minus lenses, the two sets of lenses being arranged in two series each occupying about one-half of the annular row of openings and the disk being provided with designating marks adjacent to each lens to indicate the strength of the lens. The disk may be readily turned to present the opening or any one of the lens-carrying openings in alinement with the tube 20, so that the patient may inspect the type carried by the type-plate 16 through any one of said lenses, and one lens after another may be adjusted to position until a suitable lens is found, the number of said lens indicating the defect and the glasses most suitable for the patient. In order to properly center each lens in alinement with the opening and to maintain the same in proper position, the inner face of the disk is provided with a row of notches 32, one of which is arranged in radial alinement with each of the lenses, and the arm 21 is provided with a spring-detent 33, adapted to engage in said notches. A second disk 30 is also provided with an annular row of openings, all of which, with one exception, are provided with double-convex lenses 34, any one of which may be moved into alinement with the tube 20 and the disk being provided with designating data to indicate the value or strength of each lens. The unobstructed openings in the two disks permit of the presentation of any single cylindrical or any single double-convex lens in alinement with the tube 20, and if no single lens of either class is found sufficient to remedy the defect of vision any combination of spherical and double-convex lenses may be tried until the desired result is accomplished.

In order to increase the number of combinations possible, I employ a pivoted arm 35, having any desired number of openings in which are arranged a number of lenses 36, the arm being mounted on the pivot-screw 37, which may be clamped in position by a milled nut 38. This arm may be adjusted to present any one of its lenses in alinement with the tube 20 or it may be moved down out of the way to the position indicated in Fig. 1.

When a lens of the proper strength has been found, it then becomes desirable to measure the axis of the lens most suitable to the patient, and this is accomplished by gradually turning the arm 21 until the proper angle is reached, this angle being indicated on the scale 25 by means of the pointer 24.

The device as described is so arranged and constructed that it may be conveniently carried from place to place; but when used in an office or hospital the casing may be mounted on a slotted bracket 40, secured to a wall or other support carrying the test-type, the casing being capable of adjustment on the bracket to any desired distance from the wall and then clamped and retained in place by a thumb nut and screw 41.

While the construction herein described and illustrated in the accompanying drawings is the preferred form of the device, it is obvious that various changes in the form, proportions, size, and minor details of the structure may be made without departing from the spirit or sacrificing any of the advantages of the invention.

Having thus described my invention, what I claim is—

1. The combination in an optometer, of the casing, a centrally-disposed tube carried thereby, an arm pivotally mounted on said tube and carrying a hand or pointer, a degree-scale over which the hand or pointer may be moved, a plurality of revoluble disks carried by the arm and each provided with an annular series of openings movable into alinement with said tube, and lenses of varying strength mounted in said openings, there being an unobstructed opening in each of the disks to permit single lenses of either disk to be employed for testing.

2. The combination in an optometer, of the casing, a tube carried thereby, an arm pivoted to said tube and provided at one end with a hand or pointer and an operating pin or knob, a degree-scale over which the hand or pointer may be moved, pivot-studs carried by said arm, revoluble lens-carrying disks mounted on the studs, an annular row of lenses disposed in each disk and movable into alinement with the tube, and detents carried by the arm for engaging and holding the disks in adjusted position.

3. The combination in an optometer, of the casing, a tube carried thereby, an arm pivoted on said tube, a plurality of lens-carrying disks revolubly mounted on the arm, an auxiliary lens-carrying arm pivotally mounted and movable to present any one of its lenses in alinement with the tube, and means for clamping said lens-carrying arm in adjusted position, substantially as specified.

4. The combination in an optometer, of the casing having an adjustable rear wall, a slotted slide carried thereby and adjustable with relation thereto, a test-type-carrying plate hinged to said slide, and a plurality of testing-lenses arranged at the front portion of the casing, substantially as specified.

5. The combination in an optometer, of the casing having a hinged rear wall or cover 12, a slide 13 mounted on said cover and provided with a longitudinal slot 14, a clamping-screw 15 passing through the slot and adapted to clamp the slide in adjusted position, a test-type-carrying plate 16 hinged to the outer end of the slide and provided with an opening for the reception of the clamping-screw when the parts are folded together, a tube 20 arranged at the front of the casing and provided with a flaring outer end, an arm 21 pivotally mounted on said tube at a point within the casing, an annular flange 23 formed on the tube and serving to confine the arm in position, a hand or pointer 24 disposed at one end of the arm, a degree-scale 25 over which the hand or pointer may be moved, an operating-pin 26 carried by the arm, pivot-studs carried by said arm, lens-carrying disks 29 and 30 mounted on the studs and provided with an annular series of lenses movable into alinement with the tube 20, each of the disks having an unobstructed opening to permit the adjustment of single lenses to a position in alinement with the tube, detents carried by the arm and serving to hold the disks in adjusted position, an auxiliary pivoted arm 35 in the rear of the disks, and lenses 36 carried by said arm 35, substantially as specified.

In testimony that I claim the foregoing as my own I have hereto affixed my signature in the presence of two witnesses.

ERNEST F. WAITS.

Witnesses:
T. E. HENRY,
W. D. STRIPLISS.